United States Patent [19]
Owen

[11] 3,864,519
[45] Feb. 4, 1975

[54] SPEECH-GAP-RESPONSIVE CONTROL APPARATUS

[75] Inventor: James Owen, Milwaukie, Oreg.

[73] Assignee: Ford Industries, Inc., Portland, Oreg.

[22] Filed: May 11, 1973

[21] Appl. No.: 359,476

[52] U.S. Cl..... 179/1 VC, 179/1 SA, 179/100.1 VC
[51] Int. Cl. .............................................. H04m 1/00
[58] Field of Search ......... 179/1 VC, 1 HF, 1 SA, 179/100.1 VC, 15 AS, 2 DP; 340/148

[56] References Cited

UNITED STATES PATENTS

| | | | |
|---|---|---|---|
| 3,304,372 | 2/1967 | Filipowsky | 179/2 DP |
| 3,448,215 | 6/1969 | Engel | 179/1 VC |
| 3,671,673 | 6/1972 | Uchida | 179/1 VC |
| 3,688,043 | 8/1972 | Konno | 179/100.1 VC |
| 3,723,667 | 3/1973 | Park | 179/1 VC |

*Primary Examiner*—Kathleen H. Claffy
*Assistant Examiner*—Thomas D'Amico
*Attorney, Agent, or Firm*—Kolisch, Hartwell, Dickinson & Stuart

[57] ABSTRACT

A circuit for detecting the presence of talking signals in a telephone line and the like. The circuit determines, as being a talking signal, any signal containing successive pairs of time gaps, where each gap in a pair exceeds a first preselected time span, and the first gap in a pair is shorter than a second, longer preselected time span. These two time spans are chosen to be related to the gaps which ordinarily characterize normal speech.

4 Claims, 2 Drawing Figures

SPEECH-GAP-RESPONSIVE CONTROL APPARATUS

BACKGROUND AND SUMMARY OF THE INVENTION

This invention pertains to apparatus for determining the presence or absence of a normal speech signal in a telephone line. For the purpose of illustration, a preferred embodiment of the invention is disclosed herein as being incorporated in a conventional telephone-answering system, with which the invention has been found to have particular utility.

The usual telephone-answering device functions to answer an incoming call on a telephone line—normally for the purpose of playing out to the calling party some prerecorded message, and for then allowing this party to record a message of his own. With such a device, it is important that after the completion of a calling party's message, or in the event that no such message is delivered, a talking connection with the telephone line is broken to assure readiness in the device properly to handle the next incoming call. The device, in other words, should be equipped to detect the presence of a normal speech signal in a line, and to distinguish such a signal from other conditions (i.e., silence, "off-hook" tones, busy tones, etc.) which may occasionally exist in the line.

A general object of the present invention is to provide a novel signal-monitoring control circuit, or apparatus, for reliably detecting the presence of normal speech in a telephone line or the like.

Another object of the invention is to provide such a circuit which makes the detection mentioned by looking for the presence of a signal containing certain pairs of successive time gaps which are characteristic of normal speech.

Still a further object of the invention is to provide a circuit of the type generally indicated which produces an output control signal on determining that normal speech signals are not present in a line.

Experience has shown that normal speech contains many successive time gaps in the range of about 166–528 milliseconds. This range, when related to the half-period times of periodic waves, defines frequencies in the range of about 2–6 Hz. Such frequencies are quite different from those characterizing non-speech signals (such as those mentioned above) that occur in a telephone line. For example, a typical "off-hook" signal comprises periodic pulses having a repetition rate in excess of 6 Hz., with each pulse containing a frequency well above 6 Hz. The usual busy tone also comprises periodic pulses—in this case with a repetition rate below 2 Hz., and with each pulse containing a frequency exceeding 6 Hz.

Thus, a more specific object of the invention is to provide a circuit of the type outlined above which looks for a line signal having successive time gaps generally falling, as will be explained, within the limited range of time just mentioned.

In general terms, the invention comprises three principal components: an input circuit, which is adapted to be coupled to a telephone line for the purpose of receiving signals carried therein; a criterion-determining circuit, connected to this input circuit and constructed to determine as being an "acceptable" signal, any signal containing successive pairs of time gaps having characteristics as will be more fully explained below; and an output circuit, connected to the criterion-determining circuit, and operable to produce an output control signal (that may be used for breaking a talking connection) in the absence of receipt by the input circuit of an acceptable signal. Extreme accuracy in the monitoring of signals is obtained by using digital circuitry in the criterion-determining circuit.

DESCRIPTION OF THE DRAWINGS

These and other objects and advantages attained by the invention will become more fully apparent as the description which follows is read in conjunction with the accompanying drawings, wherein.

DETAILED DESCRIPTION OF THE INVENTION

1. Explanation of Terminology

Figure 1:
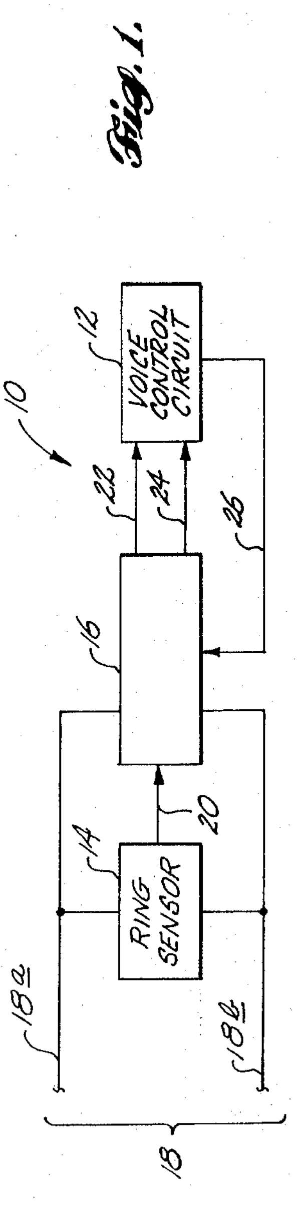
FIG. 1 is a block diagram illustrating a telephone-answering system which employs control apparatus as contemplated herein.

Explaining briefly certain terminology which will be used in the description which follows, various components shown in the drawings operate in response to a pair of voltage levels. More specifically, one of these levels corresponds to a certain positive voltage (typically about +3 volts) which will be referred to hereinafter as a 1 state. The other level corresponds essentially to ground, and will be called hereinafter a 0 state. A terminal or a conductor having one of these voltage levels on it will be referred to as being in, or as having on it, either a 1 or a 0 state.

2. Descriptions of Logic Gates and Flip-Flops Used

Among the components illustrated in the drawings which respond to the two voltage levels just mentioned are certain logic gates and flip-flops. More specifically, two different types of gates, and one type of flip-flop, all conventional in construction, are employed. The two types of gates used are referred to as NAND and NOR gates.

A NAND gate functions as follows: with a 0 state on any input of the gate, the output thereof is held in a 1 state; with all inputs in 1 states, the output is placed also in a 0 state.

In a NOR gate: if any input is in a 1 state, the output is held in a 0 state; if all inputs are placed in 0 states, then the output is placed in a 1 state.

Figure 2:
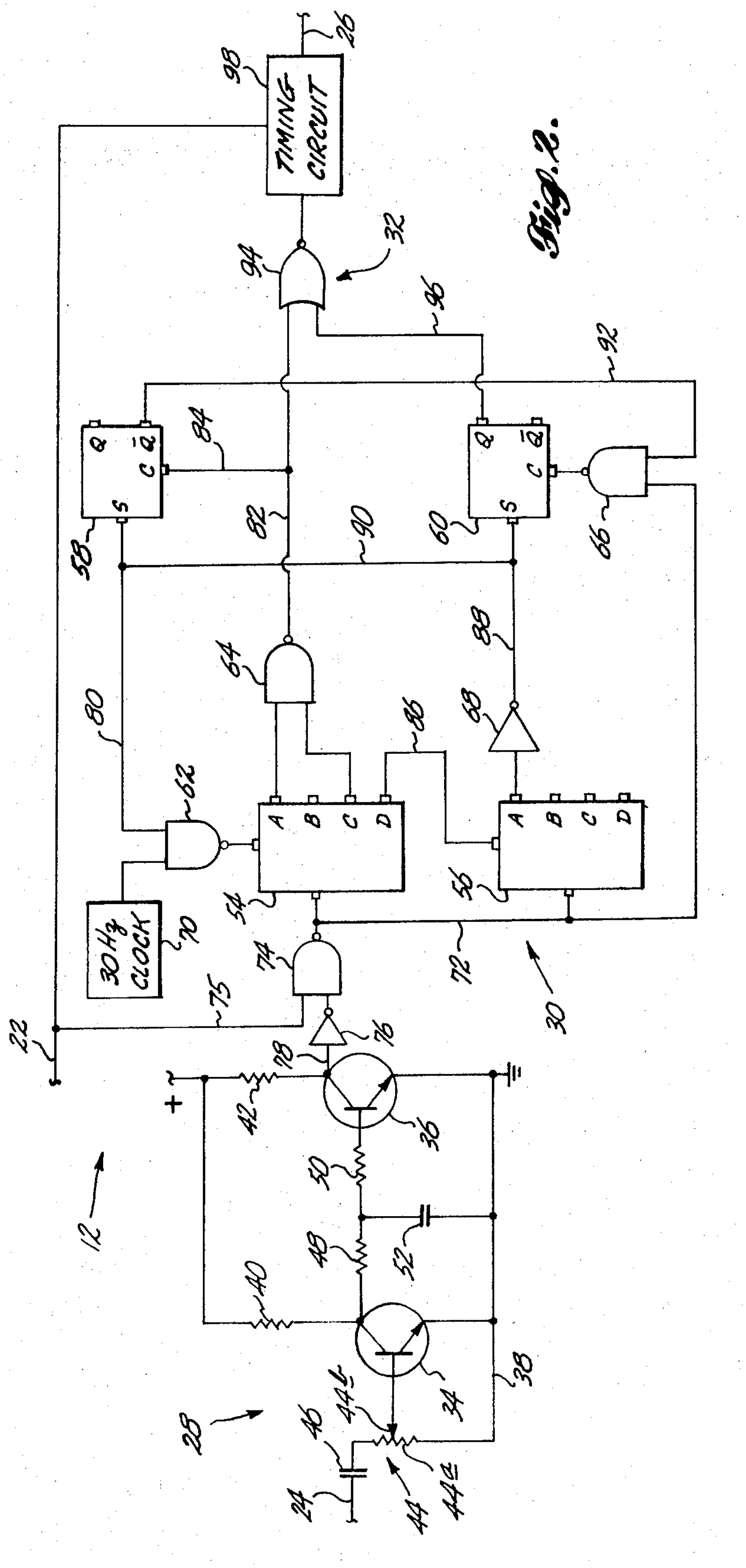
FIG. 2 is a circuit diagram illustrating details of the control apparatus used in the system of FIG. 1.

The flip-flops used are represented in FIG. 2 as rectangles containing the letters S, C, Q and $\overline{Q}$. These letters in a block mark the four terminals in a flip-flop—the letter S representing the "set" terminal and the letter C representing the "clear" terminal. The letters Q, $\overline{Q}$ are conventional designations for what might be thought of as output terminals in a flip-flop.

Each of these flip-flops is said to be in a cleared condition when a 0 state exists on its Q terminal and a 1 exists on its $\overline{Q}$ terminal. In a set condition, the states on the Q, $\overline{Q}$ terminals are reversed. With a flip-flop in a cleared condition, it is nonresponsive to voltage state changes on its clear terminal. However, a state change of 1 to 0 on its set terminal causes the flip-flop to switch from a cleared to a set condition. When in a set condition, a flip-flop is nonresponsive to state changes on its set terminal, but is responsive to a state change of 1 to 0 on its clear terminal. Such a state change causes the flip flop to switch from a set to a cleared condition.

3. The System of FIG. 1

Turning now to the drawings, and referring first to FIG. 1, indicated generally at 10 is a telephone-answering system of the type which may be used at the location of a subscriber's telephone to receive incoming calls when the subscriber is absent. System 10 includes a voice control circuit, or signal-monitoring control apparatus, 12 constructed according to the invention, a conventional ring sensor 14, and additional conventional telephone-answering apparatus represented by block 16. The apparatus represented by block 16 includes, for example, message recording and playback means and associated circuitry, none of which forms any part of the present invention. System 10, as shown in FIG. 1, is connected to receive incoming calls on a telephone line 18 which includes the usual pair of conductors 18*a*, 18*b*. Ring sensor 14 and block 16 are connected directly between conductors 18*a*, 18*b*. In addition, the ring sensor and block 16 are interconnected through a conductor 20. Three conductors, indicated at 22, 24, 26, interconnect circuit 12 and apparatus and block 16. As will be more fully explained, conductors 22, 24 are for supplying information from apparatus in block 16 to circuit 12, and conductor 26 is for supplying information in the reverse direction.

Briefly explaining the operation of system 10, in very general terms, when ringing occurs in line 18, ring sensor 14 responds and supplies a suitable signal via conductor 20 to apparatus in block 16. The apparatus in this block then establishes a talking connection with line 18, whereupon a prerecorded message, left by the subscriber, is played out over the line to the calling party. Such a message will be referred to hereinafter as an announcement. At the end of the announcement, the talking connection established with line 18 is maintained to allow the calling party, if he so desires, to record a message which may later be heard by the subscriber.

Voice control circuit 12 plays an important part from this point on in the operation of system 10. More specifically, at the end of the announcement, a signal indicating that such has occurred is supplied to circuit 12 over conductor 22. At essentially the same time, an operative connection is established via conductor 24, and through apparatus in block 16, with line 18, whereupon control circuit 12 can monitor electrical signals in the telephone line. With these steps accomplished, control circuit 12 then monitors signals in the telephone line to determine whether and when the talking connection (previously established) with the line should be broken. With circuit 12, so long as normal talking signals are present in the line, with these signals having a gap characteristic which will be explained more fully later, the talking connection is maintained. However, if these signal conditions are not met, then control circuit 12 supplies an output control signal via conductor 26 to apparatus in block 16 which is effective to break the talking connection with line 18.

4. Details of Control Circuit 12

Turning now to FIG. 2 which illustrates details of control circuit 12, this circuit includes an input circuit 28, a criterion-determining circuit 30, and an output circuit 32.

Input circuit 28 comprises a pair of transistors 34, 36. The emitters of transistors 34, 36 are connected to a grounded conductor 38 and the collectors of the transistors are connected to a suitable source of positive voltage through resistors 40, 42, respectively. The base of transistor 34 connects with the wiper 44*b* of an adjustable resistor 44. One end of the resistance element 44*a* of resistor 44 is connected to conductor 38, and the other end of this element is connected through a coupling capacitor 46 to conductor 24. The collector of transistor 34 connects with the base of transistor 36 through series resistors 48, 50. The junction between these resistors is connected through a capacitor 52 to conductor 38.

Circuit 30 includes two four-bit digital counters, or pulse counting means, 54, 56, a pair of flip-flops 58, 60, three two-input NAND gates 62, 64, 66, and an inverter 68. Circuit 30 also includes a 30 Hz. clock, or clock pulse means, 70. These components are referred to collectively herein as digital circuit means. Each component is conventional in construction.

Explaining briefly how counters 54, 56 perform (these two counters being substantially the same in construction), with a 0 state existing on the reset terminal of a counter, each negative-going edge of a square wave voltage pulse supplied to the counting terminal in the counter results in a change of voltage state on one or more of the four output terminals in the counter. With a 1 state applied to the reset terminal, the counter automatically resets to, and remains in, a zero-count condition. Table I which follows indicates the respective voltage states that exist on the different output terminals in each counter for a given count registered therein.

TABLE I

| Counted Pulse | States of Output Terminals A | B | C | D |
|---|---|---|---|---|
| 0 (Zero-count condition) | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

The reset terminals of counters 54, 56 are each connected to a conductor 72, and also to the output of a two-input NAND gate 74. This gate is substantially the same in construction as the NAND gates already mentioned. The upper input of gate 74 is connected through a conductor 75 to conductor 22, and the lower input of the gate is connected to the output of an inverter 76. The input of inverter 76 is connected through a conductor 78 to the collector of transistor 36.

The counting terminal of counter 54 is connected to the output of gate 62, whose left input is connected to clock 70 and whose right input is connected through a conductor 80 to the set terminal of flip-flop 58. Output terminals A,C of counter 54 are connected, respectively, to the upper and lower inputs of gate 64, the output of this gate being connected through conductors 82, 84 to the clear terminal of flip-flop 58. Output terminal D of counter 54 is connected through a conductor 86 to the counting terminal of counter 56. Output terminal B of counter 54 is left unconnected to anything external to the counter.

Only output terminal A of counter 56 is connected to external components, and in circuit 30 is connected to the input of inverter 68. The output of inverter 68 is connected through a conductor 88 to the set terminal of flip-flop 60, and further is connected through conductor 88 and a conductor 90 to previously mentioned conductor 80.

Conductor 72 is connected to the left input of gate 66, the right input of this gate being connected through a conductor 92 to the $\overline{Q}$ terminal of flip-flop 58. The output of gate 66 is connected to the clear terminal of flip-flop 60. The Q terminal of flip-flop 58, and the $\overline{Q}$ terminal of flip-flop 60, are left unconnected to anything external to these flip-flops.

Output circuit 32 comprises a two-input NOR gate 94. The upper input of this gate is connected to previously mentioned conductor 82, and the lower input of the gate is connected through a conductor 96 to the Q terminal of flip-flop 60. The output of gate 94 is connected to an "actuating" input in a conventional timing circuit 98. What might be thought of as an "arming" input in this circuit is connected to conductor 22. The output of circuit 98 is connected to conductor 26.

With a 0 state present on conductor 22, timing circuit 98 is unable to respond to any state changes on the output of gate 94, and further, is held in a nonoperative condition. With a 1 state present on conductor 22, then, if a 0 state exists on the output of gate 94, the timing circuit begins operating in a timing cycle, at the end of which (herein about 11 seconds) it places a 1 state on conductor 26. Initially, conductor 26 is held in a 0 state. However, during operation of the timing circuit, should the voltage state on the output of gate 94 change from 0 to 1, the timing circuit is reset to its initial condition, from which it may again begin in a timing cycle should the voltage on the output of gate 94 thereafter return to a 0 state. A voltage state change on the output of circuit 98 from 0 to 1 is referred to herein as an output control signal.

5. Operational Description

Explaining now how circuit 12 performs, let us first consider the initial conditions which exist in the circuit with system 10 awaiting an incoming call on line 18. In this situation, transistor 34 is off, and transistor 36 and clock 70 are on. Circuitry in block 16 applies a 0 state to conductor 22, which results in gate 74 being held closed, and timing circuit 98 being held in a disabled and nonoperative condition. The output of the timing circuit, therefore, supplies a 0 state to conductor 26.

With gate 74 closed, its output terminal applies a 1 state to the reset terminals of counters 54, 56, and also to the left input of gate 66. As a consequence, the counters are held in zero-count conditions, with 0 states existing on each of their respective output terminals. As a further consequence of this situation, gate 64 applies a 1 state to conductors 82, 84, and to the upper input of gate 94. Inverter 68 applies a 1 state to conductors 80, 88, 90, and thus to the set terminals of flip-flops 58, 60 and the right input of gate 62. Gate 62 is thus open to the transmission of pulses from clock 70 to the counting input of counter 54. Of course, counter 54 is not now in a condition to respond to these pulses.

Flip-flops 58, 60 are initially in cleared conditions, with the $\overline{Q}$ terminal of flip-flop 58 applying a 1 state through conductor 92 to the right input of gate 66, and with the Q terminal of flip-flop 60 applying a 0 state through conductor 96 to the lower input of gate 94. Because the upper input of gate 94 is initially in a 1 state, the output of this gate is in a 0 state.

When a call comes in over line 18, ring sensor 14 responds to the ringing current in the line which signals the arrival of the call. The ring sensor sends a signal via conductor 20 to activate apparatus in block 16. Such apparatus "answers" the call by establishing a talking connection with the telephone line. Suitable apparatus in block 16 also then causes a prerecorded announcement (from the subscriber) to be played out over the line. During the transmission of this announcement, conductor 22 is still maintained in a 0 state. Nothing of consequence occurs in circuit 12 until the end of this announcement.

When the announcement ends, conductor 22 is placed in a 1 state, and an operative connection is established through block 16 between conductor 24 and the telephone line. The particular kinds of apparatus in block 16 for accomplishing these ends may take any one of a number of forms well known to those skilled in the art, and thus are not shown herein. After such answering of a call, other apparatus in block 16 starts up a magnetic tape, or the like, for recording any incoming message which the calling party may now wish to leave.

With placement of conductor 22 in a 1 state, the output of gate 74 switches to a 0 state, which action frees counters 54, 56 to begin counting. Since gate 62 is in a condition passing pulses from clock 70 to the counting terminal of counter 54, this counter begins counting such pulses. Also, and as a consequence of conductor 22 being placed in a 1 state, timing circuit 98 begins operation in its timing cycle. It will be recalled that the output of gate 94 is now in a 0 state.

As was mentioned earlier, circuit 12 is intended to determine whether or not normal speech is present in telephone line 18. If it is, and if the time gaps in it are not too large (i.e., in excess of about 11 seconds), the talking connection just established with the line is to be maintained. If normal speech is not present, then, after a span of about 11 seconds, this talking connection is to be broken so as to prepare system 10 for responding to the next incoming call.

Among the various kinds of non-speech conditions that might exist in line 18, which conditions ought to result in breaking of a talking connection with the line, are: (1) complete silence for the time span just mentioned; (2) a continuous nongapped signal which lasts for the same time span; and (3) an interrupted or gapped signal, such as that for example, which is typically used to indicate an "off-hook" condition or a busy tone. In circuit 12, silence or a continuous signal lasting for about 11 seconds will results (as will be explained) in breaking of a talking connection with line 18. An interrupted signal outside the frequency range of about 2 to 6 Hz. will also result in breaking such a connection. Normal speech, however, will result in maintenance of a talking connection.

Let us, then, consider how circuit 12 performs with each of the above conditions respectively existing in line 18. After starting up of counter 54 (following the end of the announcement), if complete silence exists in the line, transistors 34, 36 remain off and on, respectively. Counter 54 counts up to a count of FIVE, whereupon its output terminals A,C are simultaneously in 1 states, with the result that the output of gate 64 is placed momentarily in a 0 state. This 0 state is applied to the upper input of gate 94, whose lower input is also at this time in a 0 state. As a consequence, the output of gate 94 applies a 1 state momentarily to the actuating input of timing circuit 98. Such action results in resetting of the timing circuit to its initial condition, where it may again begin a timing cycle. All of this action takes place about 166 milliseconds after beginning of counting in counter 54. Obviously, conductor 26 is maintained in a 0 state.

With continued silence on the telephone line, counter 54 continues counting, and on reaching a count of SIX, returns the outputs of gates 64, 94 to their initial conditions, thus causing timing circuit 98 to begin a new timing cycle.

When counter 56 reaches a count of ONE, which occurs about 528 milliseconds after the beginning of counting in counter 54, output A of counter 56 is placed in a 1 state. Such results in the output of inverter 68 applying a 0 state to the set inputs of flip-flops 58, 60, and to the right input of gate 62. The state change thus occurring on the set inputs of the flip-flops switches both of these flip-flops into set conditions. Under these circumstances, the $\overline{Q}$ terminal of flip-flop 58 applies a 0 state to the right input of gate 66, thus closing this gate, and the Q terminal of flip-flop 60 applies a 1 state to the lower input of gate 94, thus locking the output of this gate in a 0 state. Further, with a 0 state applied to the right input of gate 62, this gate is then closed to the transmission of pulses from clock 70. Consequently, counting in counters 54, 56 ceases. Timing circuit 98, however, continues operating in its timing cycle. And, if silence continues on the telephone line throughout the duration of this timing cycle, at the end of such cycle circuit 98 applies a 1 state to conductor 26. This 1 state is received by suitable apparatus in block 16, and is effective to cause breaking of the talking connection with line 18.

In the case of a continuous (non-gapped) signal in the telephone line, outside the frequency range of about 2 to 6 Hz., transistor 34 is on, and transistor 36 off. Thus, the input of inverter 76 is in a 1 state, and the output thereof in a 0 state—locking the output of gate 74 in a 1 state. With this the situation, counters 54, 56 are held in zero-count conditions. And, gate 94 is held in a condition with a 0 state on its output—with timing circuit 98 thus in a condition operating in a timing cycle. Should such a continuous signal last throughout the timing cycle of circuit 98, the talking connection with the telephone line is broken, as described earlier.

In the case where an interrupted signal, such as an offhook tone, with a frequency in excess of about 6 Hz. exists in the line, counter 54, although counting pulses from clock 70, is never able to reach a count of FIVE. Consequently, the outputs of gates 64, 94 remain in 1 and 0 states, respectively. Obviously, if this condition lasts throughout a timing cycle of circuit 98, the talking connection with line 18 is broken.

Under circumstances with a signal existing in line 18, with a frequency lower than about 2 Hz., such as the interrupted nature of a busy tone signal, and if this condition lasts beyond the length of a timing cycle in circuit 98, the same sort of action will result. The reason for this is that at the end of the first 528 milliseconds of counting in counters 54, 56, flip-flop 60, along with flip-flop 58 will be placed in a set condition. This, it will be recalled, results in placing of a 1 state on the lower input of gate 94, which then locks the output of gate 94 in a 0 state. Because the period of a signal having such a frequency exceeds 528 milliseconds, it will not be possible for flip-flop 60 to be cleared. The reason for this is that to clear flip-flop 60 requires 1 states on both inputs of gate 66, which, in turn, requires that a 1 state occur on conductor 72 while flip-flop 58 is in a cleared condition. With a signal's half-period exceeding 528 milliseconds, there will never be a signal gap short enough to produce a 1 state on conductor 72 (resulting from the resumption of a signal on the telephone line) while flip-flop 58 is cleared. It will be recalled that flip-flop 58 is cleared, during a signal gap on the telephone line, only after 166 milliseconds into the gap, and only until the elapse of 528 milliseconds, at which time it is again set.

With this flip-flop remaining in a set condition, gate 94 remains in a condition with a 0 state on its output terminal. Thus, timing circuit 98 will complete its timing cycle, and cause breaking of the talking connection.

Describing how circuit 12 performs in the presence of normal speech, from the point in time when a calling party may begin recording a message, there will typically be some span of time before he begins to do so. Assuming that this initial time span is less than 528 milliseconds, then, and as will become apparent, the talking connection with the telephone line remains intact so long as there continues in the telephone line a gapped signal condition, with gaps exceeding 166 milliseconds but being less than 528 milliseconds, and with no gaps, and no interval between a gap, exceeding the 11-second timing cycle of timing circuit 98. For example, when speech begins before the elapse of 528 milliseconds (from the time when incoming message recording may begin), transistor 34 turns on and transistor 36 turns off. This results in a 1 state being applied to the reset terminals of counters 54, 56, resetting counter 54 to a zero-count condition. Counter 56, of course, prior to the elapse of 528 milliseconds, remains in a zero-count condition.

Assuming, then, that prior to the end of a timing cycle in circuit 98, a normal speech gap (greater than 166 milliseconds, but less than 528 milliseconds) occurs in the signal in the line, such a gap will return transistor 34 to a nonconducting state and transistor 36 to a conducting state, and thus will allow counting in the counters sufficiently long to allow a count of FIVE in counter 54. On this occurring, gate 64 applies a 0 state to the upper input of gate 94, whose output is then switched momentarily into a 1 state to reset the timing circuit. It will be obvious that if this gapped normal speech pattern continues, timing circuit 98 will be periodically reset so as not to complete its timing cycle.

However, after there exists in the telephone line any signal gap exceeding 528 milliseconds, circuit 12 then examines the signal pattern in the line to detect a pair of successive signal gaps which indicate the presence of normal speech. These two gaps need not be immediately adjacent one another, but must occur within a time span prior to the completion of a timing cycle in circuit 98.

More specifically, it will be recalled that after the elapse of 528 milliseconds, a count of ONE will be registered in counter 56, and flip-flops 58, 60 will be in set conditions. As was explained earlier, if there remains an absence of a signal in the telephone line for a sufficiently long period of time, timing circuit 98 will time out and break the talking connection. Assuming, however, that prior to this occurring a signal does occur in the telephone line, this results in turning on of transistor 34 and turning off of transistor 36. Such action results in resetting of counters 54, 56 to zero-count conditions. No change occurs in the voltage state on the output of gate 94 at this time. Thus, timing circuit 98 continues operating in its timing cycle. Of course, if this signal remains continuous (i.e., nongapped) for a sufficiently long time, circuit 98 will time out.

Assuming, however, that normal speech is present in the telephone line, then, a signal gap will soon occur which will turn off transistor 34 and turn on transistor 36. Such action allows counters 54, 56 to begin counting again. Circuit 12 now examines, so-to-speak, this gap to see if it is longer than 166 milliseconds, but shorter than 528 milliseconds. Such a gap, of course, is characteristic of normal speech. If this is the case, then, at 166 milliseconds into the gap, the output of gate 64 applies a 0 state to the clear terminal of flip-flop 58, which then clears this flip-flop. Flip-flop 60, however, remains in a set condition, and circuit 98 continues operating in a timing cycle.

When, before the elapse of 528 milliseconds into the gap, a signal resumes in the telephone line, transistor 34 again conducts, and transistor 36 again turns off. As a consequence, counter 54 is reset to a zero-count condition, and a 1 state voltage is applied to the left input of gate 66. It will be observed that at this point in time, 1 states exist on both inputs of gate 66. The output of this gate thus switches from 1 to 0, and clears flip-flop 60. The Q terminal of flip-flop 60 now applies a 0 state to the lower input of gate 94. Timing circuit 98, however, continues operating in its timing cycle, since there is now a 1 state applied to the upper input of gate 94.

In the operation just described, circuit 12 has determined that there has existed in the signal in the telephone line at least one signal gap characteristic of normal speech. More specifically, it has determined that a gap has occurred having a length falling within the two time limits mentioned. In order to assure that normal speed exists, circuit 12 now further examines the signal conditions in the line to determine if, before completion of the now progressing timing cycle in circuit 98, there occurs a second signal gap which is at least 166 milliseconds long. Such a test has been found by experience to be entirely adequate. If such a gap exists, circuit 12, in effect, decides that indeed normal speech does exist in the telephone line, and that the talking connection with the line should be maintained.

Assuming, then, that before the end of the timing cycle in circuit 98, another gap begins, transistor 34 turns off and transistor 36 turns on to allow counters 54, 56 again to begin counting. With ths gap exceeding 166 milliseconds, at 166 milliseconds the output of gate 64 supplies a 0 state to the upper input of gate 94. Recalling that the lower input of gate 94 is also at this time in a 0 state, the output of the gate is switched momentarily to a 1 state. Such an action results in resetting of the timing circuit.

The operation just described is performed continuously with a talking connection in existence. And, if during any timing cycle of circuit 98, circuit 12 fails to detect gap characteristics (as detailed) peculiar to normal speech, the talking connection is broken.

Thus, the circuit disclosed herein operates to detect the presence of normal speech in a line such as a telephone line. Conditions such as total silence, a continuous signal, and any gapped signal not having the gap pattern of normal speech, are all rejected. After any period of signal silence exceeding 528 milliseconds, the circuit "tests" the signal conditions in the line to find a pair of successive time gaps such as those discussed in the last-explained operation. Circuit 12 thus reliably monitors the presence or absence of normal speech, and reliably determines whether or not the talking connection with a line should be broken.

The use of digital components and techniques in circuit 12 results in highly accurate performance in the circuit.

While a preferred embodiment of the invention has been described, it is appreciated that variations and modifications may be made without departing from the spirit of the invention.

It is claimed and desired to secure by Letters Patent:

1. Signal-monitoring control apparatus for use in combination with a telephone line and the like to verify the presence therein of a signal having certain signal gap characteristics, said apparatus comprising

- an input circuit adapted to be operatively coupled to such a line to receive an electrical signal carried therein, constructed to produce an output response of one type with a signal present in the line, and an output response of another type in the absence of such a signal,
- digital counting circuitry operatively connected to said input circuit operable during times that said input circuit produces an output response of said other type to produce a count reflective of the duration of such a response,
- digital monitoring circuit means operatively connected to said counting circuitry for monitoring the different counts produced thereby during different output responses of said other type from said input circuit,
- a resettable timing circuit having a timing cycle at the end of which it produces an output signal, and
- means interconnecting said monitoring circuit means and said timing circuit for resetting said timing circuit on a recurring basis when the monitoring circuit detects, prior to the expiration of a timing cycle, recurrent counts in said counting circuitry each of which exceeds a first predetermined count but is less than a second predetermined count, whereby the production of an output signal from said timing circuit is prevented.

2. Signal-monitoring control apparatus for use in combination with a telephone line and the like to verify the presence therein of a signal having certain signal gap characteristics, said apparatus comprising

- an input circuit adapted to be operatively coupled to such a line to receive an electrical signal carried therein, constructed to produce an output response of one type with a signal present in the line, and an output response of another type in the absence of such a signal,
- digital counting circuitry operatively connected to said input circuit operable during times that said input circuit produces an output response of said other type to produce a count reflective of the duration of such a response, digital monitoring circuit means operatively connected to said counting circuitry for monitoring the different counts produced thereby during different output responses of said other type from said input circuit, a resettable timing circuit having a timing cycle at the end of which it produces an output signal, and means interconnecting said monitoring circuit means and said timing circuit for resetting said timing circuit on a recurring basis when the monitoring circuit detects, prior to the expiration of a timing cycle, recurrent counts in said counting circuitry each of which exceeds a first predetermined count but is less than a second predetermined count, whereby the production of an output signal from said timing circuit is prevented, said interconnecting means including means which, following production by said counting circuitry of a count equaling said second predetermined count, makes resetting of said timing circuit in time to prevent an output signal impossible unless, within any remaining portion of a then-progressing timing cycle of the timing circuit, the counting circuitry produces a pair of time-spaced counts with the first being greater than said first predetermined count but less than said second predetermined count, and with the second being at least equal to said first predetermined count.

3. Signal-monitoring control apparatus for use in combination with a telephone line and the like to verify the presence therein of a signal having certain signal gap characteristics, said apparatus comprising an input circuit adapted to be operatively coupled to such a line to receive an electrical signal carried therein, constructed to produce an output response of one type with a signal present in a line, and an output response of another type in the absence of such a signal, a clock pulse generator, digital counting means operatively connected both to said input circuit and to said generator in such a manner that the counting means is enabled to count pulses supplied by said generator with said input circuit producing a response of said other type, thus to achieve different count conditions, and is disabled from counting such pulses with the input circuit producing a response of said one type, changing of the response from said input circuit from one of said other type to one of said one type effecting resetting of said counting means to a zero-count condition.

a resettable timing circuit including a reset terminal, and operable from a reset condition to produce an output signal at the end of an uninterrupted first preselected time span, receipt of a reset signal on said reset terminal interrupting the operation of the timing circuit and placing it in a reset condition, and digital logic circuit means operatively interconnecting said input circuit, said counting means and said reset terminal of said timing circuit for recurrently supplying reset signals to said timing circuit's reset terminal to prevent the timing circuit from producing an output signal under circumstances with said input circuit producing recurrent output responses of said other type, with each of such responses enabling said counting means to achieve a count at least equaling a first predetermined count condition but not exceeding a second predetermined count condition, both of which count conditions are reachable within a time span equaling said first preselected time span, and with each pair of successive responses of said other type being separated by a time no greater than said first preselected time span reduced by the time required for said counting means to achieve a count equaling said first predetermined count condition.

4. The apparatus of claim 3, wherein said digital logic circuit means includes means which, following production by said input circuit of an output response of said other type that enables said counting means to achieve a count condition equaling said second predetermined count condition, prevents the logic circuit means from supplying a reset signal to said reset terminal unless, before production by said timing circuit of an output signal, said counting means is enabled to achieve a pair of time-spaced count conditions with the first exceeding said first predetermined count condition but being less than said second predetermined count condition, and with the second at least equaling said first predetermined count condition.

* * * * *